Feb. 21, 1928.
P. BASMAISON
SCRAPER
Filed Sept. 16, 1925
1,659,801
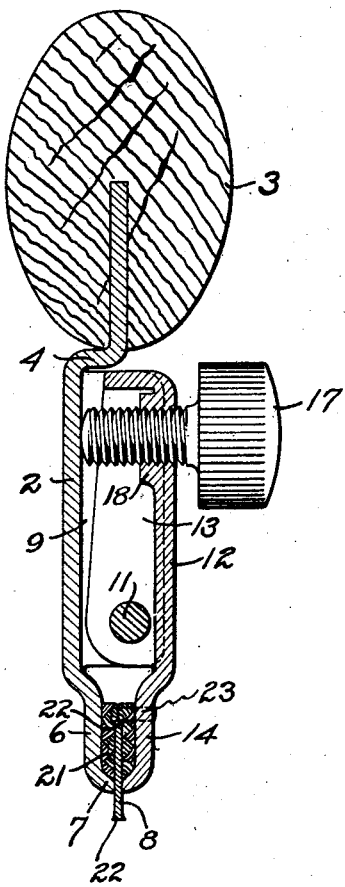
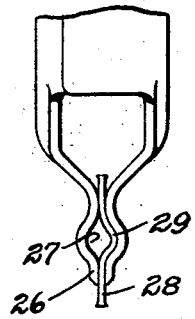
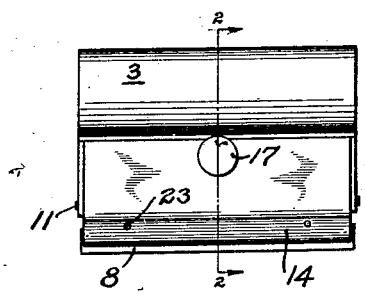
INVENTOR
PIERRE BASMAISON
BY Charles S. Evans
ATTORNEY Patented Feb. 21, 1928.

1,659,801

UNITED STATES PATENT OFFICE.

PIERRE BASMAISON, OF SAN FRANCISCO, CALIFORNIA.

SCRAPER.

Application filed September 16, 1925. Serial No. 56,603.

My invention relates to scrapers of the type generally known as cabinet scrapers. One of the objects of the invention is the provision of an improved scraper body or holding portion adapted for use with a replaceable blade.

Another object of the invention is the provision of a replaceable blade scraper in which improved means are provided for positioning the blade in the scraper holder.

My invention possesses other objects and features of advantage, some of which with the foregoing will be set forth in the following description of my invention. It is to be understood that I do not limit myself to the showing made by the said description, as I may adopt variant forms of the invention within the scope of the claims.

Referring to the drawings:

Figure 1 is a side elevation of my cabinet scraper, and

Figure 2 is a vertical sectional view, the line of section being indicated by the line 2—2 of Figure 1.

Figure 3 is a vertical sectional view of a portion of a scraper embodying my invention in different form.

My cabinet scraper comprises, in broad terms, a pair of plates pivotally connected and provided with a set screw on one side of the pivotal axis for pressing the edges on the other side of the pivotal axis together upon a replaceable blade. This screw is carried in one of the plates and impinges upon the other, which is provided with a suitable handle so that the scraper lies easily in the hand of the user. The edges engaging the blade constitute jaws and the jaws are arranged to press directly against the blade in a metal-to-metal contact so that heat generated in the blade during use is distributed by convection to the plates. The blade is made of metal of constant thickness and if desired may be bent along its longitudinal center line as shown in Figure 3 to provide a bead complementary in form to a groove in the jaws, so that when the blade is placed within the jaws the bead seats within the groove and upon the tightening of the jaws upon the blades, the latter is rigidly held. Because of the central position of the bead on the blade, the blade is reversible in the holder. Preferably however, a portion of the inner face of the jaws is lined with a conformable material such as leather, so that the rolled edge of the scraper seats therein and against stops provided for the purpose.

In greater detail the scraper of my invention comprises a plate 2 carrying the handle 3 which conveniently may be made of wood. This handle is arranged across the upper edge of the plate, which is offset as shown at 4 to bring the handle into the central plane of the tool. At the other end of the plate, the jaw 6 is formed. The lower edge is turned inwardly in a flange 7, adapted to engage the thin blade 8 in a metal-to-metal contact; and it is to be noted that the contacting edges of the jaws are of appreciable width so that a relatively wide engaging surface is provided. On each end of the plate is an inwardly extending flange 9, which provides a mounting for the pivot pin 11, which may be lightly upset on the ends to hold it in place.

Working in opposition to the plate 2 is the plate 12 also provided at its ends with inwardly turned flanges 13 which are pierced by the pivot pin 11 so that the plate 12 and the plate 2 are pivotally connected together. The plate 12 is also provided with a jaw 14 similar to the jaw 6 and terminating in a flange 16 similar to the flange 7, but opposite thereto. In order to bring the jaws together I provide a thumb screw 17 threaded into the boss 18 formed on the inner side of the plate 12 and impinging as shown on the inner surface of the plate 2.

I prefer to make the parts just described of rather heavy gauge sheet metal suitably formed in dies, but it will be understood that such parts may be otherwise formed.

Within each of the jaws 6 and 14 I secure a facing 21, preferably of conformable material such as leather. The rolled edge 22 of the blade seats in this facing, as shown in Figure 2, and since stops 23 fix the inward extension of the blade between the jaws, the rolled edge of the blade always seats in the same place.

Use of the scraper generates a great amount of heat therein. Because of the metal-to-metal engagement of the holding jaws with the blade, the heat is conducted from the blade into the plates 2 and 12 from whose large surfaces it is radiated. Furthermore, the close setting of the jaws upon the blade, prevents the entrance of shavings therebetween, and thus protects the facings, The stops 23 prevent displacement of the blade no matter how much pressure is applied to the tool and the frictional hold on the blade prevents sideward movement.

Instead of the structure shown in Figure 2, I may make my scraper jaws and blade as shown in Figure 3, with the jaws 26 formed with a groove 27 extending longitudinally thereof. The blade comprises a strip 28 of suitable steel and preferably of constant thickness. Along the longitudinal center line of the strip 28 is a bead 29 formed by bending the strip as shown. The bead thus formed is complementary in form to the grooves 27 and may be positioned in either one. That is to say, it is immaterial, when the blade is placed in the jaws, on which side the bead is, since on either side it seats in the groove formed in the jaw.

It will be obvious that when the jaws are tightened upon the blade by means of the set screw, a very rigid connection is formed and the blade is held immovable. At the same time loosening the set screw permits the ready removal of the blade for resharpening.

I claim:

1. The combination with a metal scraper blade of jaws terminating in aligned inwardly extending metal flanges adapted to engage the blade, a facing of conformable material disposed between said jaws and forming additional blade clamping means, and means for clamping the jaws upon the blade.

2. The combination with a metal scraper blade of metal jaws terminating in flanges each having a relatively wide face adapted to engage the blade, a facing of conformable material disposed within each jaw and providing additional clamping means for the blade, and means for clamping the jaws upon the blade.

In testimony whereof, I have hereunto set my hand.

PIERRE BASMAISON.